US011240366B2

(12) United States Patent
Hassan et al.

(10) Patent No.: US 11,240,366 B2
(45) Date of Patent: Feb. 1, 2022

(54) DIGITAL ASSISTANT FOR EMERGENCY CALLING

(71) Applicant: Microsoft Technology Licensing, LLC, Redmond, WA (US)

(72) Inventors: Amer Aref Hassan, Kirkland, WA (US); Gareth L. E. Bridges, Redmond, WA (US); Frank Bruce Shearar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/780,687

(22) Filed: Feb. 3, 2020

(65) Prior Publication Data
US 2021/0243294 A1    Aug. 5, 2021

(51) Int. Cl.
| H04W 4/02 | (2018.01) |
|---|---|
| H04W 76/50 | (2018.01) |
| H04M 1/72418 | (2021.01) |
| H04W 4/029 | (2018.01) |
| H04W 4/90 | (2018.01) |
| G10L 15/18 | (2013.01) |
| G10L 15/22 | (2006.01) |
| H04W 64/00 | (2009.01) |

(52) U.S. Cl.
CPC ..... H04M 1/72418 (2021.01); G10L 15/1822 (2013.01); G10L 15/22 (2013.01); H04W 4/029 (2018.02); H04W 4/90 (2018.02); H04W 64/003 (2013.01); H04W 76/50 (2018.02); *G10L 2015/223* (2013.01); *G10L 2015/228* (2013.01); *H04M 2242/30* (2013.01)

(58) Field of Classification Search
CPC ........ H04M 1/72536; H04M 2242/30; H04M 2242/15; H04W 4/029; H04W 4/90; H04W 76/50; H04W 64/003; H04W 4/025; H04W 88/02; G10L 15/1822; G10L 15/22; G10L 2015/223; G10L 2015/228; G10L 15/02
See application file for complete search history.

(56) References Cited

U.S. PATENT DOCUMENTS 8,467,500 B2   6/2013 Hidajat
9,300,784 B2   3/2016 Roberts et al.
(Continued)

OTHER PUBLICATIONS

"Samsung Galaxy S II User Manual", (c) 2011 Samsung Telecommunications America, (2011), 202 Pages.
(Continued)

*Primary Examiner* — Khawar Iqbal
(74) *Attorney, Agent, or Firm* — Schwegman Lundberg & Woessner, P.A.

(57) ABSTRACT

Systems and methods may be used for providing a location of a device during an emergency communication. These systems and methods may include operations (e.g., performed by a processor), including detecting that an emergency service call has been started at the device, and initiating a digital assistant in response to detecting that the emergency service call has been started. The systems and methods may include operations including parsing audio during the emergency service call to determine a request for location information, and providing audio, by the digital assistant during the emergency service call, indicating a location based on location information determined at the device.

20 Claims, 7 Drawing Sheets

(56) References Cited

U.S. PATENT DOCUMENTS

| | | | |
|---|---|---|---|
| 9,462,112 | B2 | 10/2016 | Woolsey et al. |
| 9,514,227 | B1 | 12/2016 | Garrett et al. |
| 10,044,857 | B2 | 8/2018 | Philbin |
| 10,134,395 | B2 | 11/2018 | Typrin |
| 10,296,587 | B2 | 5/2019 | Heck et al. |
| 10,325,592 | B2* | 6/2019 | Talwar ............... G01C 21/3608 |
| 10,356,240 | B2 | 7/2019 | Self et al. |
| 10,382,895 | B2* | 8/2019 | Pai ........................ H04W 4/023 |
| 10,701,542 | B2* | 6/2020 | Martin ..................... H04W 4/21 |
| 2014/0099973 | A1* | 4/2014 | Cecchini ................ H04L 67/36 |
| | | | 455/456.3 |
| 2014/0297288 | A1 | 10/2014 | Yu et al. |
| 2016/0203817 | A1* | 7/2016 | Formhals ............... G10L 15/08 |
| | | | 379/45 |
| 2018/0012615 | A1* | 1/2018 | Zhou ..................... G11B 27/28 |
| 2018/0075712 | A1* | 3/2018 | Field ..................... G08B 25/016 |
| 2018/0337962 | A1 | 11/2018 | Ly et al. |
| 2019/0230476 | A1 | 7/2019 | Qi et al. |
| 2019/0289450 | A1 | 9/2019 | Gray |
| 2020/0041300 | A1* | 2/2020 | Min ........................ G10L 15/00 |
| 2020/0094964 | A1* | 3/2020 | Myslinski .............. G05D 1/104 |
| 2020/0162880 | A1* | 5/2020 | Patton ..................... G10L 15/22 |
| 2020/0213445 | A1* | 7/2020 | Chien ................. H04L 67/2804 |
| 2020/0258508 | A1* | 8/2020 | Aggarwal ........... G01C 21/3608 |
| 2020/0334639 | A1* | 10/2020 | Ramakrishnan ..... G06Q 10/107 |
| 2020/0365157 | A1* | 11/2020 | Bhaya ................... G06F 9/4843 |
| 2021/0119802 | A1* | 4/2021 | Shetty ................... H04L 9/3231 |
| 2021/0152687 | A1* | 5/2021 | Reber ................. H04M 3/5116 |
| 2021/0199458 | A1* | 7/2021 | Aggarwal ............... G06F 40/30 |

OTHER PUBLICATIONS

Kavafian, Hagop, "Assistant's context-aware recommendations are live for some in Messages 4.4", Retrieved From: https://www.androidpolice.com/2019/05/21/assistants-context-aware-recommendations-are-live-in-messages-4-4-apk-download/, May 21, 2019, 6 Pages.

Li, Abner, "Google Phone app on Pixel Adding Emergency Calling Without having to Speak", Retrieved from https://9to5google.com/2019/08/01/google-phone-emergency-calling/, Aug. 1, 2019, 5 Pages.

O'Neil, Sean, "Microsoft wants you to use Skype to book hotels and other travel", Retrieved From: https://www.phocuswire.com/Microsoft-wants-you-to-use-Skype-to-book-hotels-and-other-travel, Mar. 30, 2016, 9 Pages.

Rossman, Jim, "Using Amazon's Alexa for phone calls can come in handy in emergency",Retrieved From: https://www.ajc.com/technology/using-amazon-alexa-for-phone-calls-can-come-handy-emergency/sRg0JUz3eYfF9XkySMtHhL/, Jun. 21, 2018, 7 Pages.

"International Search Report and Written Opinion Issued in PCT Application No. PCT/US21/014059", dated May 6, 2021, 12 Pages.

\* cited by examiner

DIGITAL ASSISTANT FOR EMERGENCY CALLING

BACKGROUND

In traditional 911 or other emergency service calls, for example in the United States, a landline's location is automatically sent to a dispatcher receiving the call. In addition to landline emergency services, enhanced 911 (e.g., e911 or E112 in Europe) is available for aiding in location determination for an emergency call from a device (e.g., a cell phone). However, location data for a device is sometimes unreliable, and obtaining precise or accurate location data may be difficult.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
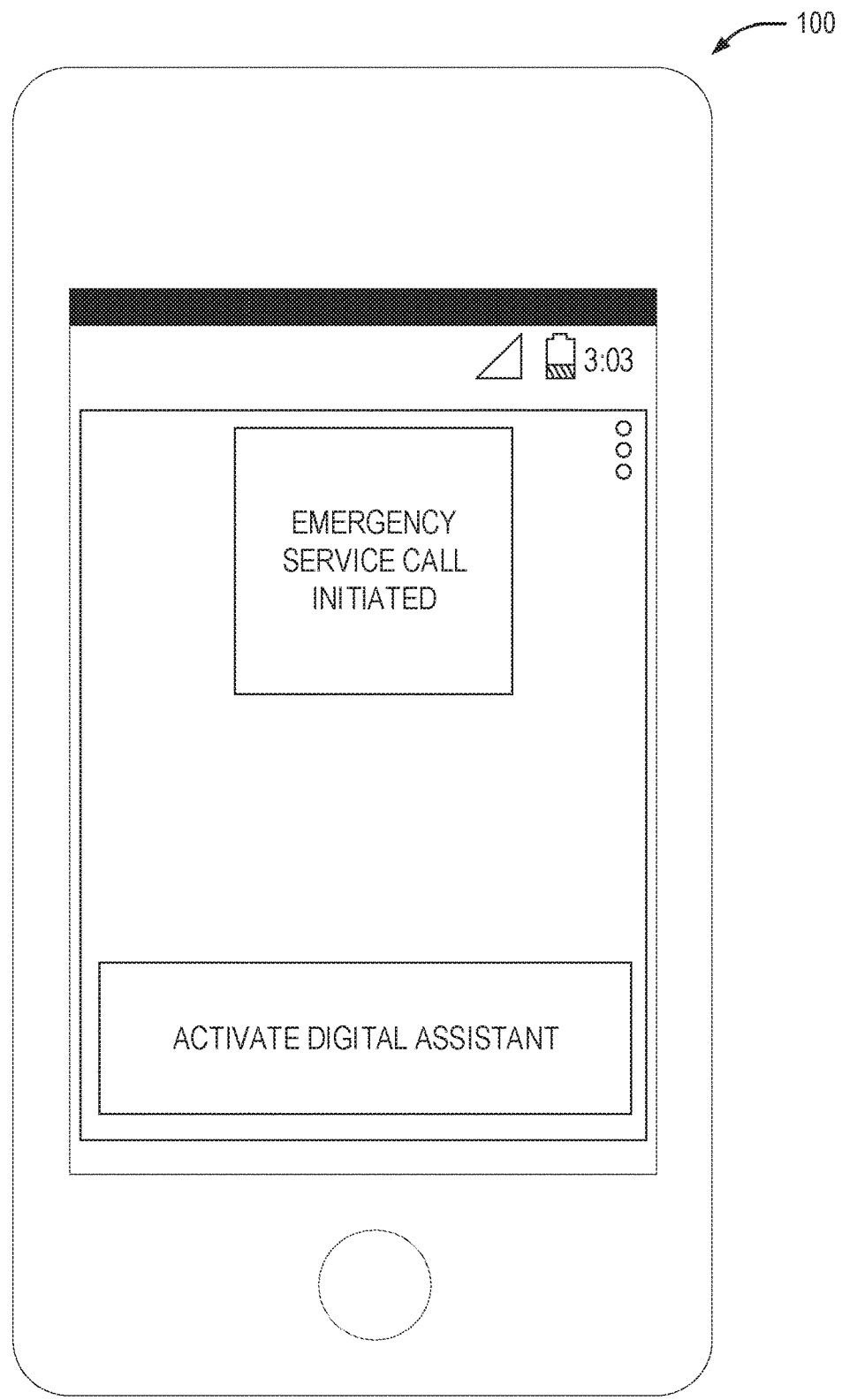
FIGS. 1-3 illustrate an example device for activating a digital assistant during an emergency communication according to some examples of the present disclosure.

Systems and methods for providing a location during an emergency communication via a device are described herein. These systems and methods may be used to provide address or location services during an emergency communication (e.g., a call, such as from a device). In an example, precise or accurate location data for a device may not be available or accurate when the location is provided by a user to an emergency service. For example, a user may not know an exact location or address, may be mistaken (e.g., due to emergency circumstances), due to reliance on the user's memory or issues with clearly remembering during an emergency, or the like. Some jurisdictions require or rely on a user to provide location information when requesting emergency services or reporting an emergency from a device.

The systems and methods described herein solve the technical issues involved with unknown location information of a device or issues with inaccuracy and unreliability of user-provided addresses. The systems and methods described herein solve these technical issues by accurately and reliably providing location information for a device. The location information is automatically determined, and is provided by a digital assistant. A digital assistant is a program, app, bot, or other code configured to interact with a user or perform tasks.

In an example, systems and methods described herein may automatically invoke a digital assistant to participate in an emergency communication. The digital assistant may be invoked responsive to a specific dialed number (such as 911, 999, etc.) or wake-up word or phrase determined during a conversation. The digital assistant may listen to the conversation or converse with participants of the emergency communication. In an example, in response to a question or comment (explicit or implicit) about a location of a participating device, the digital assistant may automatically provide audio or text (e.g., a map) regarding the location.

A digital assistant may be inactive before an emergency communication is initiated, and in response to the emergency communication being initiated, a keyword or phrase spoken, a button press, or other user input, the digital assistant may be activated. The digital assistant may run entirely or substantially on a user device (e.g., the device initiating the emergency communication). When run entirely on the user device, the digital assistant may run in a limited manner (e.g., may not provide full functionality, such as not providing search results, translations, or the like). In an example, when the digital assistant is run entirely on the user device, the digital assistant may not connect to another device or may not connect to any device other than a device contacted via the initiated emergency communication. When run substantially on the user device, the digital assistant may receive or send limited information (e.g., send address data to a remote device), but may not operate in a full capacity (e.g., may have limited capabilities). In another example, the digital assistant may run in a full functionality mode, for example, in communication with a remote server (e.g., one not associated with the emergency communication or emergency device or server).

Figure 2:
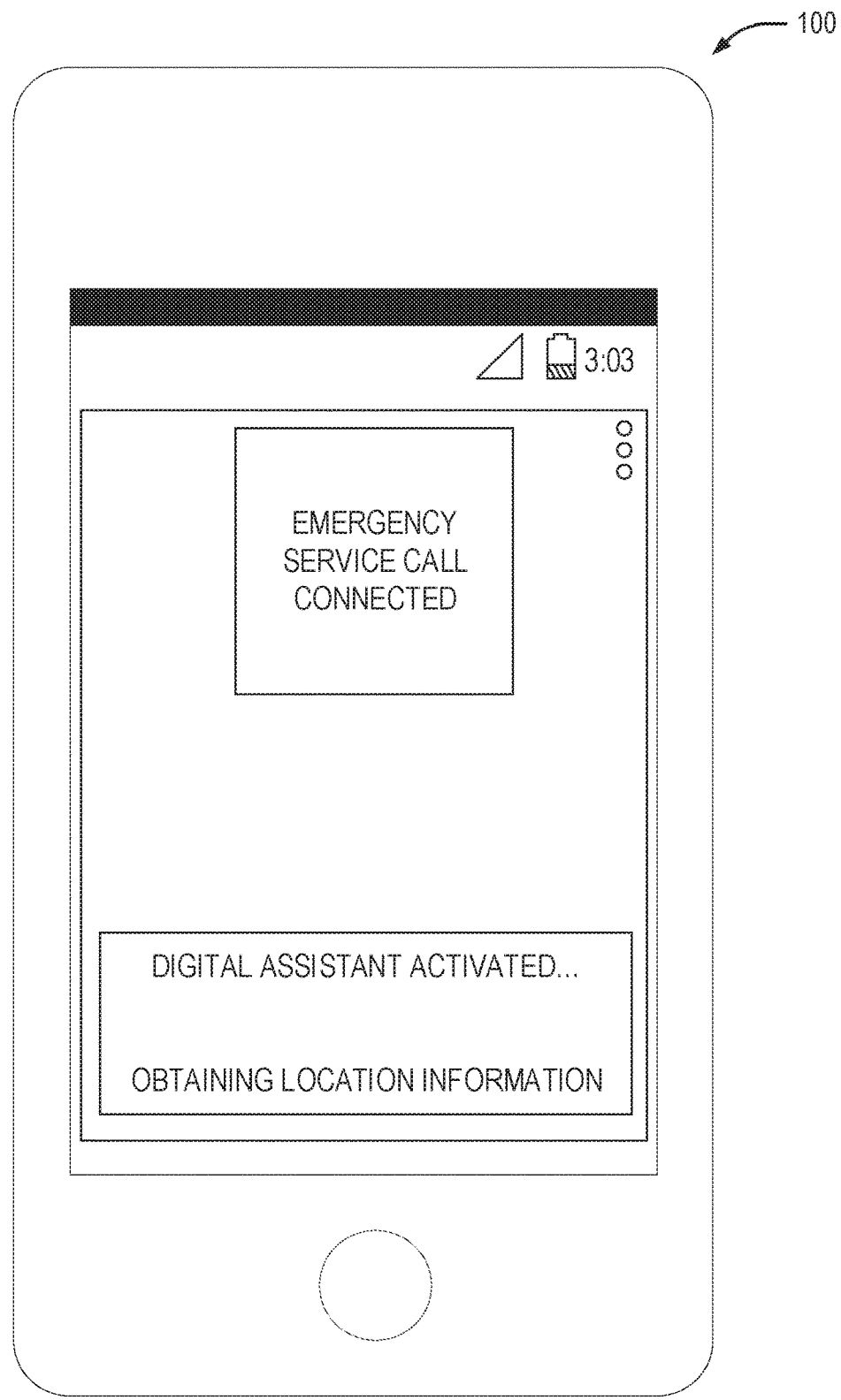
Figure 3:
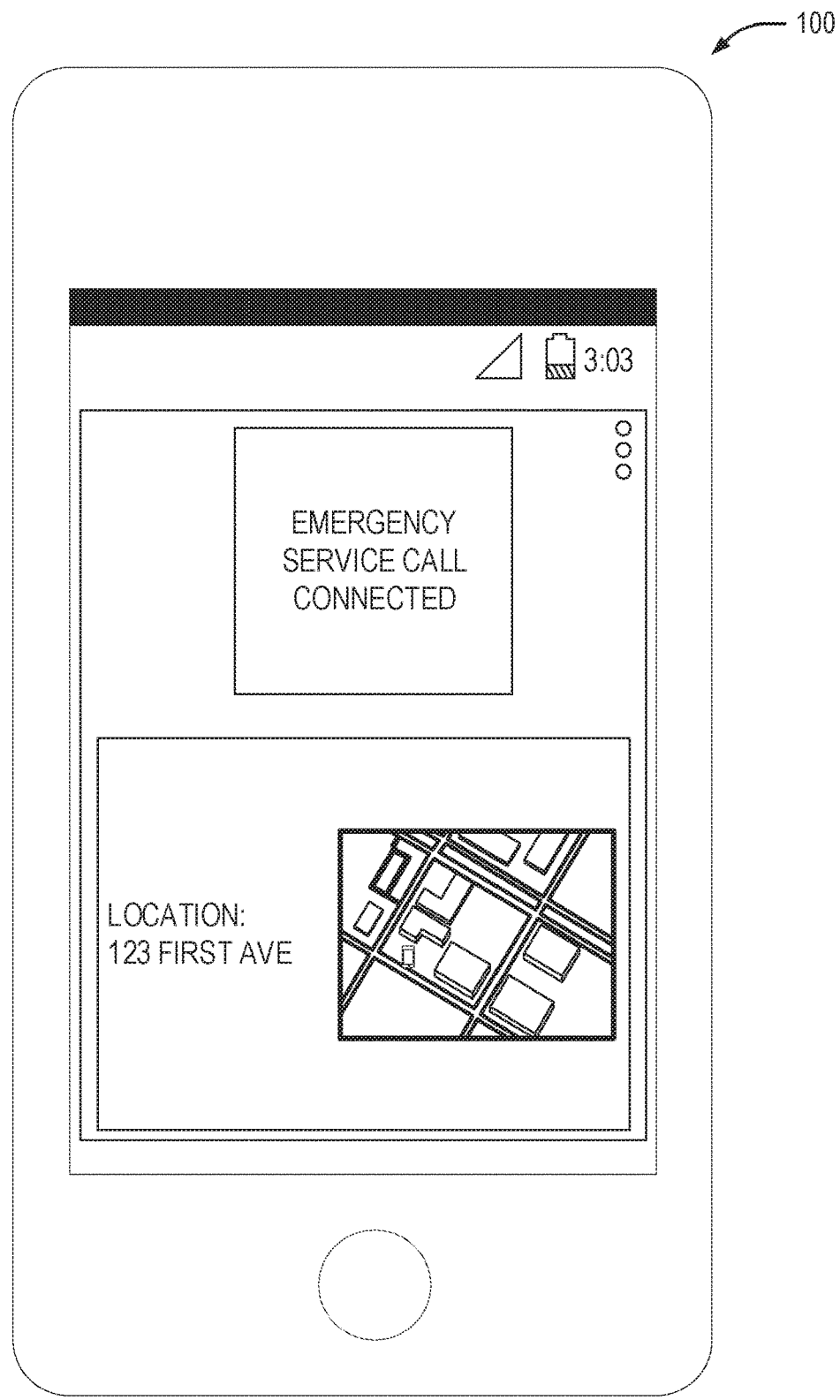

FIGS. 1-3 illustrate an example device 100 for activating a digital assistant during an emergency communication according to some examples of the present disclosure. A digital assistant may already be running when the emergency communication is initiated, or may be activated in response to an aspect of the emergency communication as detailed below. In an example, the device 100 is a mobile device, such as a tablet, cell phone, laptop, or the like.

The device 100 may be used to initiate an emergency communication (e.g., with an emergency service device, such as via a call by dialing 911, 999, 112, 110, 120, 119, etc.). FIG. 1 shows the device 100 in a state where the emergency communication is activated. In response to initiation of the emergency communication, a digital assistant may be activated. The initiation of the emergency communication to trigger activation of the digital assistant may include entry of numbers to place the call (e.g., when the numbers 9, 1, and 1 are entered in sequence, the digital assistant may be activated). Activation of the digital assistant at initiation may be in response to a user selecting a dial indication (e.g., entering 911, followed by pressing a button such as connect, place call, etc.). Activation of the digital assistant at initiation may be in response to the call connecting, for example, with an emergency service device. In an example, activation of the digital assistant at initiation of the emergency communication may be in response to a signal initiating the emergency communication being sent by the device 100.

In another example, the digital assistant may be activated during the emergency communication. The activation may be in response to spoken audio such as a keyword or a phrase, an explicit request for location information, an implicit request for location information, or the like. A keyword or phrase may include a word or phrase specific to a particular digital assistant (e.g., "Hey Cortana" for the digital assistant from Microsoft of Redmond, Wash.), a phrase selected by a user or a particular emergency service provider (e.g., "start assistant"), or a phrase universal to emergency service systems or digital assistants (e.g., "911 bot").

In another example where the digital assistant may be activated during the emergency communication, the activation may be in response to an explicit or implicit request for location information. An explicit request may include a user of the device 100 or a remotely connected device (via the emergency communication) speaking a request for location information, such as, "digital assistant, say my location" by the user of the device 100 or "digital assistant, give the location of the device 100" by the user of the remotely connected device. The explicit request may include other phrasings, such as "need address, digital assistant," "help with location," or the like.

In an example, natural language processing may be used to identify a request for a location. Because the digital assistant may be running in a limited capacity (e.g., without accessing any network resources), the device 100 may store sufficient information for natural language processing to determine the request (explicit or implicit) for a location. Sufficient information in this context may include a limited model for processing language, for example to identify only a request (explicit or implicit) for location information.

An implicit request for location information may include a statement of uncertainty, from a user of the device 100 or a user of a connected emergency service (e.g., "I'm not sure where I am"), a request for clarification or more information (e.g., "Can you repeat that address?"), an incomplete statement of location or address (e.g., "I'm at the house across the street from the library"), or the like. The digital assistant may use natural language processing to determine that an implicit request for location information has occurred. In an example, natural language processing may occur for any emergency communication, and in response to the detection of an implicit location request, the digital assistant may be activated. The natural language processing may use limited resources of the device 100 (e.g., optionally without using network resources), such as to only detect whether an explicit or implicit request for location information has occurred. The limited identification may allow the natural language processing to occur on the device 100 without taxing the device, sufficiently quickly enough to provide location information in real-time or substantially real-time (e.g., within a few milliseconds, within 1 second, etc.) during an emergency communication.

In another example, a text-based request for location information may trigger activation of the digital assistant. For example, a user of the device 100 may input (e.g., by selecting an option on a user interface of the device 100 or by entering text within a digital assistant text box) a request for a current location of the device 100. This input may activate the digital assistant, which may then provide an address or location or prompt an already running digital assistant to provide an address or location. A user of a device of an emergency service may send a text-based request for location information, which may be received at the device 100. On receipt of the request, the device 100 may activate the digital assistant (or prompt an already running digital assistant). The digital assistant may respond to the request using audio or text. In an example, the request from the emergency service device may occur in the background, such as without the user of the device 100 being aware of the request (e.g., receiving or sending a response), for example by a background process, with no user interface component showing the request or that a response was sent. In another example, the request may be shown to the user who may respond in addition to the digital assistant providing a location.

In an example, a user of the device 100 may opt-in to a service that automatically activates a digital assistant for an emergency communication, even when no digital assistant is already setup or initialized on the device 100. For example, the digital assistant may be specifically used for communicating in the emergency communication, but otherwise not operable on the device 100.

FIG. 2 shows the device 100 in a state where the emergency communication has been initiated and is now connected, and the digital assistant is activated. FIG. 2 includes an example where the digital assistant has been triggered to obtain location information for the device 100. The trigger is described in more detail below.

The digital assistant may obtain and provide location information in response to an explicit or implicit request for location information, which may be requested by a user of the device 100 or a user of a connected emergency service device. The digital assistant, after activation may listen in on the emergency communication to detect a request for location information.

The location information may be automatically determined by the digital assistant to find an address or location of the device 100. In an example, the address or location of the device may be determined from automatic location data of the device 100 (e.g., GPS, an address of a device connected to the device including an access point (AP) or an Evolved Terrestrial Radio Access Network (E-UTRAN) node B (eNodeB), RFID, mobile devices nearby, geofencing information, NFC, or the like), or from a combination thereof.

In an example, the address or location may be generated from location data received at the device 100. The location data may be generated from communication with a device having a known location (e.g., a communications tower) or a device having a likely address (e.g., a nearby mobile device, which may be used to compare to the device's own location data, for example from GPS, to verify, for example when both devices have matching addresses, the likelihood of that probable location increases). Example devices that the device 100 may communicate with to determine a location include an access point (e.g., a WiFi access point), an eNodeB or other base station for communicating over a wireless network, a GPS satellite, a geofence, an RFID or NFC device, a Bluetooth device, a desktop computer, a smart device (e.g., a thermostat, refrigerator, home security system, etc.), a printer, or the like. The location data may be generated from a sensor of the device 100, for example sensor data, audio data, video data, accelerometer data, historical sensor data, or the like.

FIG. 3 shows the device 100 in a state where the location information for the device 100 has been obtained by the digital assistant. Specifically, FIG. 3 shows an example where the location is displayed on the device 100. Other examples described below illustrate various techniques for providing a location from the digital assistant.

The digital assistant may provide a determined location of the device 100 using audio. The audio may include words (e.g., spoken word, vocalization, computer generated words, etc.) describing the location (e.g., "the device 100 is located on the corner of 1st Ave and Washington Street"), stating an address (e.g., "the device 100 is located at 1223 First Ave"), describing a nearby landmark (e.g., the device 100 is near the entrance to the zoo"), or the like. The audio may be audible only to a user of the device 100 (e.g., via a speaker of the device 100), audible only to a user of a connected emergency service device, or audible to both users. In another example, the audio may be sent to the connected emergency service device, but not played during the call (e.g., for later consultation or backup, or in case the device 100 becomes disconnected from the emergency service device).

The digital assistant may provide a determined location of the device 100 using text. The text may be displayed on the device 100 or sent to the connected emergency service device. When sent to the remote device, the text may be sent in a message by the digital assistant with or without user input of a user of the device 100. For example, the digital assistant may request approval to send the message from the user of the device 100 or may send the message without approval of the user. The message sent without approval may be sent such that the user of the device 100 is notified that the message was sent or the message may be sent in a manner opaque to the user of the device 100 (e.g., in a background process). The text may include location information such as an address, a landmark, a description of the location, additional information about the location (e.g., directions, nearby resources, or the like).

The digital assistant may provide a determined location of the device 100 using an image. The image may include a video. The image may include a map, for example identifying the location of the device 100. An example of an image with location information is shown in FIG. 3. The image may include a picture of the user of the device 100 (e.g., to identify the user when emergency response personnel arrive). The image may include information captured by a camera of the device 100.

A combination of any of audio, text, or an image may be used to convey the location information by the digital assistant. In an example, additional types of information may be sent instead of or in addition to audio, text, or an image, such as a link (e.g., to a website or an application, for example a link to an address that is openable by a map application), or other metadata.

In an example, the device 100 may verify whether location data for the device 100 corresponds (or is in range/proximity) to an address or location indicated by a user of the device 100 (e.g., a spoken address). When the address corresponds, the digital assistant may confirm the address for use by the emergency service. When the address entered or selected by the user is suspected to be incorrect (e.g., is outside a range or proximity of the automatically determined address or location data) the digital assistant may speak or send an alert or warning for use by the emergency service.

In an example, a confidence level may be sent, for example using audio or text to the emergency service (e.g., 90% likelihood that the location or address determined by the digital assistant is correct or 20% likelihood that neither a user identified (e.g., spoken during the emergency communication) or the automatically determined location or address is correct).

In an example, multiple addresses or locations may be determined automatically, such as according to a probability (e.g., 75% likelihood that the device is at 102 First Ave, and 25% likelihood that the device is at 104 First Ave). The multiple addresses or locations may be sent to the emergency service by the digital assistant. A most likely address or location or some or all of the multiple addresses or locations may be displayed to the user, spoken during the emergency communication, or sent to the emergency service. Likelihood information may be displayed, played (e.g., audio), or sent with a respective address or location. The digital assistant may repeatedly or continuously automatically determine location or address information, and updated location or address information may be sent (e.g., via text, image, or audio, such as during the emergency communication). In an example, the digital assistant may issue a prompt to a dispatcher or user of the emergency service device (e.g., audio heard only by the emergency service device, text, or an image displayed at the emergency service device) to ask the user (e.g., send a message to the device) for confirmation of the address or location, or suggest a change to the automatically determined address or location. In an example, a text message may be automatically generated for sending to the device on confirmation by the dispatcher or user of the emergency service.

In an example, the address or location may be automatically determined at the device in a process opaque to the user. This may include determining the location or address without any user input, or after the user opts in. This example may further include determining and sending the address or location automatically without user input or knowledge. For example, the address or location may be sent in metadata of a message without indicating to the user of the device that the address or location has been determined or sent.

Figure 4:
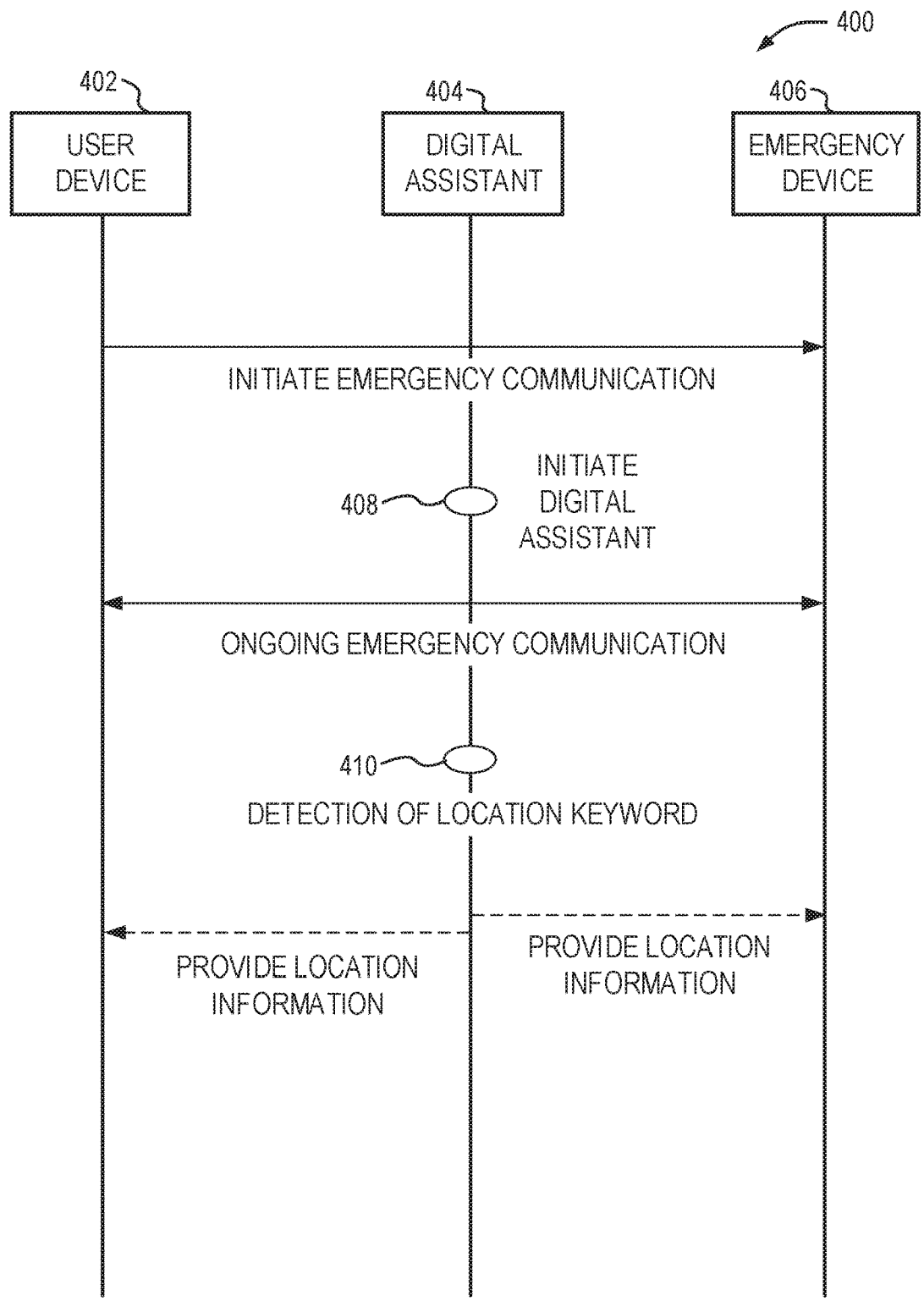
FIG. 4 illustrates an example timing diagram for providing address information during an emergency communication according to some examples of the present disclosure.

FIG. 4 illustrates an example timing diagram 400 for providing address information during an emergency communication according to some examples of the present disclosure. The timing diagram 400 illustrates entities that communicate in an emergency communication to provide location information. A user device 402 may initiate an emergency communication with an emergency device 406. A digital assistant 404 may be initiated at event 408, for example in response to the initiation of the emergency communication, in response to a keyword or phrase, or the like. Although the digital assistant 404 is shown as a separate entity, it may run entirely or partially within the user device 402 (e.g., entirely on the user device 402 may include not accessing any network resources and partially on the user device 402 may include partially running on a network, for example).

While the emergency communication is ongoing, the digital assistant 404 may eavesdrop on the conversation to identify a request (implicit or explicit), at event 410 by parsing audio during the emergency service call, for a location, such as by identifying a keyword, a location request, confusion or uncertainty about a location, or the like in the emergency communication. The request may be made via the user device 402 or the emergency device 406. In response to detecting the request for the location, the digital assistant may determine location information for the user device 402. The location information determined by the digital assistant 404 may be provided optionally to the user device 402 or optionally to the emergency device 406 (or to both). The location may be provided using audio, text, an image, or the like (e.g., via a link). In another example, the location may be identified after the digital assistant 404 is initiated but before the event 410 occurs, such that the location information is ready as soon as the event 410 is identified. In this example, the location may be provided right away after the event 410 rather than on a delay while the digital assistant 404 determines the location.

Figure 5:
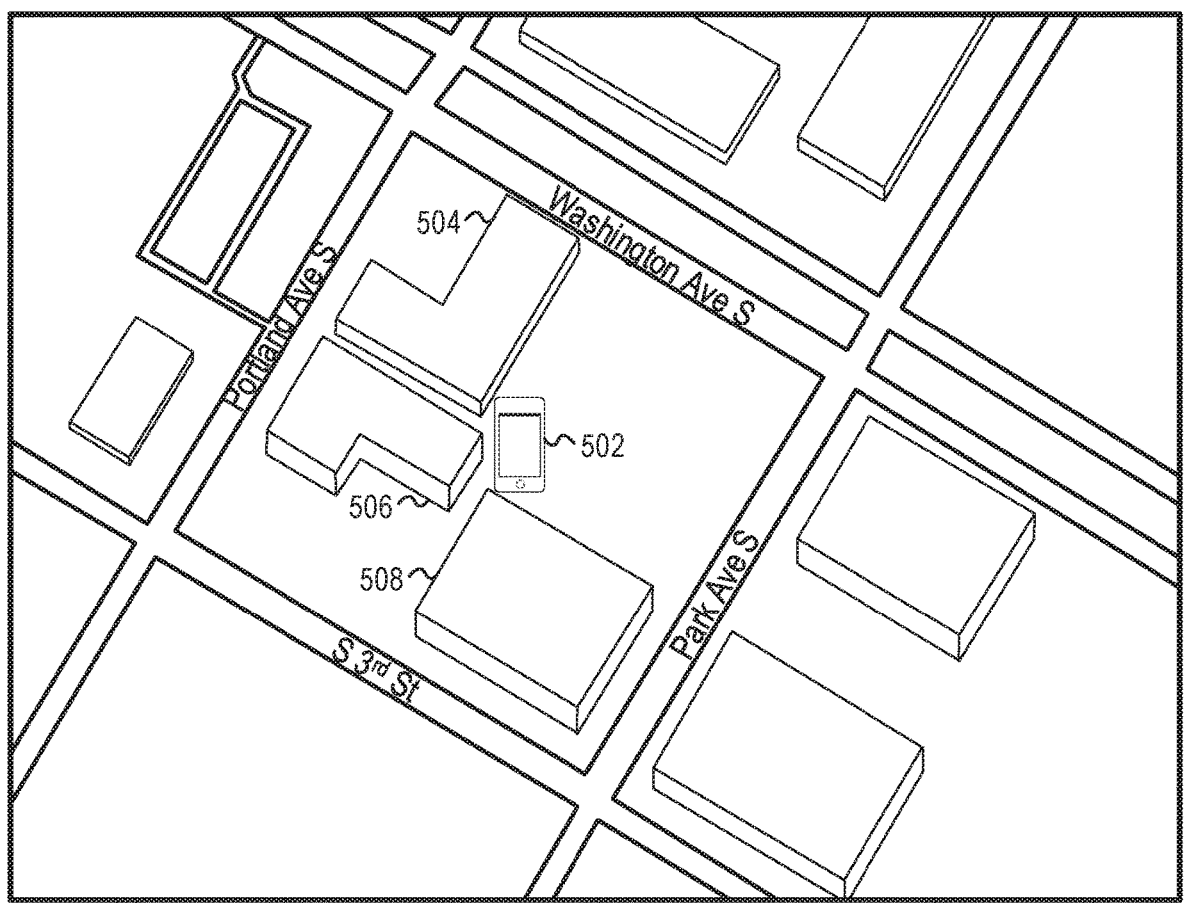
FIG. 5 illustrates a diagram of a map illustrating location information according to some examples of the present disclosure.

FIG. 5 illustrates a diagram of a map 500 illustrating location information according to some examples of the present disclosure. The map 500 shows a device 502 (e.g., a mobile device), along with a one or more likely locations (e.g., addresses) for example locations 504, 506, or 508. The map 500 is representative of various locations to show proximity and the potential for difficulty in determining an accurate address of the device 502.

The location within the map 500 of the device 502 may be determined using any of the techniques described herein (e.g., from an eNodeB, an access point, another device with a known location, a user entered address, GPS, etc.). The locations 504, 506, and 508 may, in an example, be automatically determined as a potential location of the device 502. One of the locations 504, 506, and 508 may be selected as a most probable location of the device 502 based on location data (e.g., a closest of the potential locations). A probability may be output with the location selected (or with multiple locations selected). The probable location of the device 502 may be based on user information, such as a user entered address corresponding to one of the locations 504, 506, and 508 (e.g., location 506 is the user's home or place of work), past user interaction data (e.g., location 508 is stored in the device 502 as a place the user has visited in the past, saved in a map app, or the like), user intent (e.g., location 504 is marked to be visited), or based on user data (e.g., location 506 is a saved address in a contacts list).

In the example discussed above with respect to FIGS. 1-4, one or more of the locations 504, 506, and 508 may be sent by the digital assistant (e.g., with audio, text, an image, etc.) to an emergency service device. In another example, when the device 502 verifies (before or after sending) that an address or location identified by a user (e.g., a spoken address or location) corresponds to one of the locations 504, 506, and 508, a confirmation indication (e.g., audio, text, or an image) may be generated by the digital assistant to be sent to the emergency service device. The confirmation indication may indicate that location data of the device 502 confirms the user identified address or location.

In some examples, the map may be shown to a user and the user may be able to drag and drop the device 502 to a selected location. The location the user dropped the device 502 may be sent by the digital assistant to the emergency service device.

Figure 6:
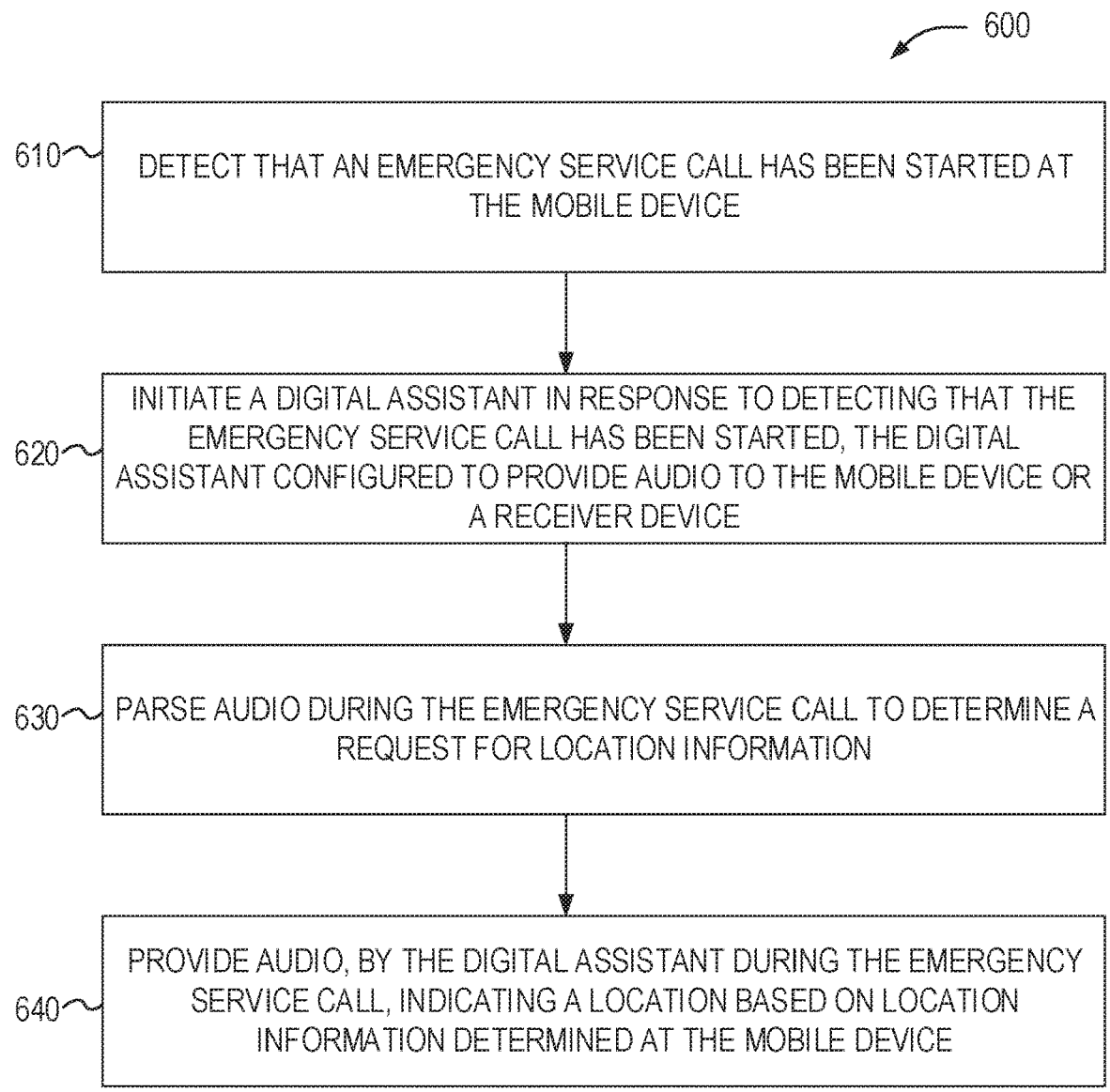
FIG. 6 illustrates a flowchart of a technique for providing location information during an emergency communication using a digital assistant according to some examples of the present disclosure.

FIG. 6 illustrates a flowchart of a technique 600 for providing location information during an emergency communication using a digital assistant according to some examples of the present disclosure. The technique 600 may be performed using a processor or processors of a device (e.g., as discussed in further detail below with respect to FIG. 7, for example a mobile device). The technique 600 includes an operation 610 to detect that an emergency service call has been started at the device.

The technique 600 includes an operation 620 to automatically initiate a digital assistant in response to detecting that the emergency service call has been initiated or started, the digital assistant configured to provide audio to the device or a receiver device of the emergency service call. In an example, the digital assistant may be heard by a user of the device, an operator of the emergency service (e.g., the call receiver), or both. In an example, the digital assistant is not running before being initiated in response to the emergency service call being started or detected. The digital assistant may be initiated without accessing any voice recognition processes (e.g., as may typically initiate the digital assistant, for example with a wake-up word or phrase). In this example, the digital assistant is automatically initiated with the initiation of the call. In other examples, a wake-up word or phrase may be used to initiate the digital assistant after the call is started. For example, operation 620 may include initiating the digital assistant in response to parsing a keyword or phrase during the emergency service call. The keyword or phrase may correspond to an emergency service system and is universal to a plurality of digital assistances. For example, the keyword may be "location", "address", "where", "digital assistant", "help", or the like. In another example, the keyword or phrase may be specific to the digital assistant (e.g., "Cortana, address"). The digital assistant may be automatically initiated absent of receiving any user voice input to initiate the digital assistant (e.g., without receiving a voice input).

The technique 600 includes an operation 630 to parse audio during the emergency service call to determine a request for location information of the device. The request may be explicit or implicit (e.g., "caller, I need your location"; "I think I'm at ADDRESS, but I'm not sure"; "I don't know where I am"; "DIGITAL ASSISTANT, tell 911 my address", etc.). The request may be received at the device from the receiver device. For example, the emergency service operator may ask for the address (e.g., "where are you located", "can you tell me your location", etc.). In an example, the location based on the location information is determined in response to detecting that the emergency service call has been started and before the request for the location information is parsed.

The technique 600 includes an operation 640 to automatically provide an audio signal, by the digital assistant during the emergency service call, the audio signal indicating a location based on the location information (e.g., as determined at the device by the digital assistant). Operation 640 may include playing audio to caller, receiver, or both. In an example, operation 640 includes providing audio that is not automatically played (e.g., by sending an audio file to the receiver for later verification, or the like). Operation 640 may be performed responsive to the determined request for the location information of the device.

The technique 600 may include running the digital assistant locally on the device during the emergency service call without accessing any network resources. The technique 600 may include generating, via the digital assistant, text or a map corresponding to the location, and sending the text or the map to the remote device. Other additional information may be identified or generated by the digital assistant for sending to the receiver, such as biometrics of the user of the device (e.g., heart rate, blood pressure, oxygen saturation, etc.), velocity or movement information of the device, previously determined location information (e.g., map data, GPS data, cell tower data, nearby device or beacon data, or the like).

Figure 7:
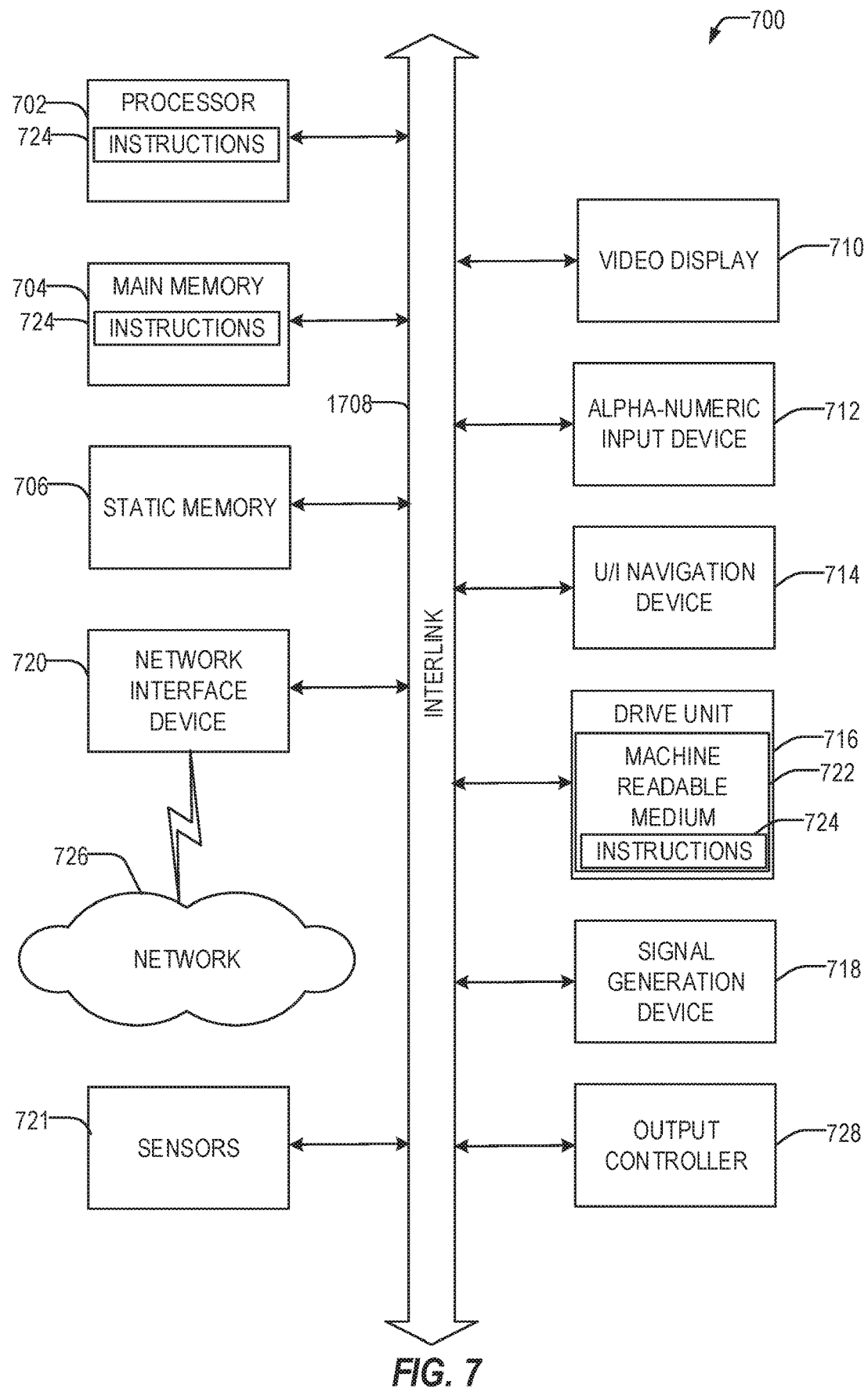
FIG. 7 illustrates a block diagram of an example machine which may implement one or more of the techniques discussed herein according to some examples of the present disclosure.

FIG. 7 illustrates a block diagram of an example machine 700 which may implement one or more of the techniques (e.g., methodologies) discussed herein according to some examples of the present disclosure. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be configured to perform the methods of FIG. 6. The machine 700 may be configured to provide the GUIs of FIGS. 1-4. In an example, the machine 700 may act as a peer machine in peer-to-peer (P2P) (or other distributed) network environment. The machine 700 may be a user device, a remote device, a second remote device or other device which may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine readable media. In some examples, machine readable media may include machine readable media that is not a transitory propagating signal.

The instructions 724 may further be transmitted or received over a communications network 726 using a transmission medium via the network interface device 720. The machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Example 1 is a method of providing an emergency service on a device, the method comprising: detecting, using at least one processor of the device, that an emergency service call has been initiated or started at the device; automatically initiating a digital assistant in response to detecting that the emergency service call has been initiated or started, the digital assistant configured to provide audio to the device and a receiver device of the emergency service call; parsing audio during the emergency service call to determine a request for location information of the device; and responsive to the determined request for the location information of the device, automatically providing an audio signal to the device and the receiver device, by the digital assistant in the emergency service call, the audio signal indicating a location based on the location information.

In Example 2, the subject matter of Example 1 includes, wherein the digital assistant was not running before being initiated in response to detecting that the emergency service call had been initiated or started.

In Example 3, the subject matter of Examples 1-2 includes, wherein the digital assistant is initiated without accessing any voice recognition processes.

In Example 4, the subject matter of Examples 1-3 includes, wherein initiating the digital assistant includes initiating the digital assistant in response to parsing a keyword during the emergency service call.

In Example 5, the subject matter of Example 4 includes, wherein the keyword corresponds to an emergency service system and is universal to a plurality of different digital assistants.

In Example 6, the subject matter of Examples 1-5 includes, wherein the request for the location information is received at the device from the receiver device.

In Example 7, the subject matter of Examples 1-6 includes, wherein the location based on the location information is determined in response to detecting that the emergency service call has been started and before the request for the location information is parsed.

In Example 8, the subject matter of Examples 1-7 includes, generating, via the digital assistant, text or a map corresponding to the location, and sending the text or the map to the remote device.

In Example 9, the subject matter of Examples 1-8 includes, wherein automatically initiating the digital assistant is performed absent of receiving any user voice input to initiate the digital assistant.

Example 10 is a device for providing an emergency service, the device comprising: one or more hardware processors; a memory, storing instructions, which when executed, cause the one or more hardware processors to perform operations comprising: detecting that an emergency service call has been initiated or started at the device; automatically initiating a digital assistant in response to detecting that the emergency service call has been initiated or started, the digital assistant configured to provide audio to the device and a receiver device of the emergency service call; parsing audio during the emergency service call to determine a request for location information of the device; and responsive to the determined request for the location information of the device, automatically providing an audio signal to the device and the receiver device, by the digital assistant in the emergency service call, the audio signal indicating a location based on the location information.

In Example 11, the subject matter of Example 10 includes, wherein the digital assistant was not running before being initiated in response to detecting that the emergency service call had been started.

In Example 12, the subject matter of Examples 10-11 includes, wherein the digital assistant is initiated without accessing any voice recognition processes.

In Example 13, the subject matter of Examples 10-12 includes, wherein initiating the digital assistant includes initiating the digital assistant in response to parsing a keyword during the emergency service call.

In Example 14, the subject matter of Examples 10-13 includes, wherein the request for the location information is received at the device from the receiver device.

In Example 15, the subject matter of Examples 10-14 includes, wherein the location based on the location information is determined in response to detecting that the emergency service call has been started and before the request for the location information is parsed.

In Example 16, the subject matter of Examples 10-15 includes, wherein, during the emergency service call, the digital assistant runs locally on the device without accessing any network resources.

In Example 17, the subject matter of Examples 10-16 includes, wherein the operations further comprise, generating, via the digital assistant, text or a map corresponding to the location, and sending the text or the map to the remote device.

In Example 18, the subject matter of Examples 1-17 includes, wherein automatically initiating the digital assistant occurs absent of receiving any user voice input to initiate the digital assistant.

Example 19 is an apparatus for providing an emergency service, the apparatus comprising: means for detecting that an emergency service call has been started at the apparatus; means for automatically initiating a digital assistant in response to detecting that the emergency service call has been initiated or started, the digital assistant configured to provide audio to the apparatus and a receiver device of the emergency service call; means for parsing audio during the emergency service call to determine a request for location information of the device; and responsive to the determined request for the location information of the device, means for automatically providing an audio signal to the apparatus and the receiver device, by the digital assistant in the emergency service call, the audio signal indicating a location based on the location information.

In Example 20, the subject matter of Example 19 includes, wherein the digital assistant was not running before being initiated in response to detecting that the emergency service call had been started.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method of providing an emergency service on a device, the method comprising:
 detecting, using at least one processor of the device, that an emergency service call has been initiated or started at the device;
 automatically initiating a digital assistant in response to detecting that the emergency service call has been initiated or started, the digital assistant configured to provide generated audio to the device and a receiver device of the emergency service call;

parsing audio during the emergency service call to determine a request for location information of the device, the request explicitly requesting the location information of the device, the location information of the device corresponding to a physical location of the device;

generating, by the digital assistant, an audio signal providing the location information of the device based on the request for the location information of the device; and responsive to the determined request for the location information of the device, automatically providing the audio signal to the device and the receiver device, by the digital assistant in the emergency service call, the audio signal originated by the digital assistant and the audio signal indicating a location based on the location information.

2. The method of claim 1, wherein the digital assistant was not running before being initiated in response to detecting that the emergency service call had been initiated or started.

3. The method of claim 1, wherein the digital assistant is initiated without accessing any voice recognition processes.

4. The method of claim 1, wherein initiating the digital assistant includes initiating the digital assistant in response to parsing a keyword during the emergency service call.

5. The method of claim 4, wherein the keyword corresponds to an emergency service system and is universal to a plurality of different digital assistants.

6. The method of claim 1, wherein the request for the location information is received at the device from the receiver device.

7. The method of claim 1, wherein the location based on the location information is determined in response to detecting that the emergency service call has been started and before the request for the location information is parsed.

8. The method of claim 1, further comprising, generating, via the digital assistant, text or a map corresponding to the location, and sending the text or the map to the remote device.

9. The method of claim 1, wherein automatically initiating the digital assistant is performed absent of receiving any user voice input to initiate the digital assistant.

10. A device for providing an emergency service, the device comprising:
one or more hardware processors;
a memory, storing instructions, which when executed, cause the one or more hardware processors to perform operations comprising:
detecting that an emergency service call has been initiated or started at the device;
automatically initiating a digital assistant in response to detecting that the emergency service call has been initiated or started, the digital assistant configured to provide generated audio to the device and a receiver device of the emergency service call;
parsing audio during the emergency service call to determine a request for location information of the device, the request explicitly requesting the location information of the device, the location information of the device corresponding to a physical location of the device;

generating, by the digital assistant, an audio signal providing the location information of the device based on the request for the location information of the device; and responsive to the determined request for the location information of the device, automatically providing the audio signal to the device and the receiver device, by the digital assistant in the emergency service call, the audio signal originated by the digital assistant and the audio signal indicating a location based on the location information.

11. The device of claim 10, wherein the digital assistant was not running before being initiated in response to detecting that the emergency service call had been started.

12. The device of claim 10, wherein the digital assistant is initiated without accessing any voice recognition processes.

13. The device of claim 10, wherein initiating the digital assistant includes initiating the digital assistant in response to parsing a keyword during the emergency service call.

14. The device of claim 10, wherein the request for the location information is received at the device from the receiver device.

15. The device of claim 10, wherein the location based on the location information is determined in response to detecting that the emergency service call has been started and before the request for the location information is parsed.

16. The device of claim 10, wherein, during the emergency service call, the digital assistant runs locally on the device without accessing any network resources.

17. The device of claim 10, wherein the operations further comprise, generating, via the digital assistant, text or a map corresponding to the location, and sending the text or the map to the remote device.

18. The device of claim 10, wherein automatically initiating the digital assistant occurs absent of receiving any user voice input to initiate the digital assistant.

19. An apparatus for providing an emergency service, the apparatus comprising:
means for detecting that an emergency service call has been started at the apparatus;
means for automatically initiating a digital assistant in response to detecting that the emergency service call has been initiated or started, the digital assistant configured to provide generated audio to the apparatus and a receiver device of the emergency service call;
means for parsing audio during the emergency service call to determine a request for location information of the device, the request explicitly requesting the location information of the device, the location information of the device corresponding to a physical location of the device;
generating, by the digital assistant, an audio signal providing the location information of the device based on the request for the location information of the device; and
responsive to the determined request for the location information of the device, means for automatically providing the audio signal to the apparatus and the receiver device, by the digital assistant in the emergency service call, the audio signal originated by the digital assistant and the audio signal indicating a location based on the location information.

20. The apparatus of claim 19, wherein the digital assistant was not running before being initiated in response to detecting that the emergency service call had been started.

* * * * *